A. S. CUBITT.
ELECTRICALLY HEATED STOVE.
APPLICATION FILED OCT. 21, 1911.

1,052,894.

Patented Feb. 11, 1913.

Witnesses:
George W. Tilden
J. Ellis Elen

Inventor:
Archibald S. Cubitt,
by Albert G. Davis
His Attorney.

UNITED STATES PATENT OFFICE.

ARCHIBALD S. CUBITT, OF RUGBY, ENGLAND, ASSIGNOR TO GENERAL ELECTRIC COMPANY, A CORPORATION OF NEW YORK.

ELECTRICALLY-HEATED STOVE.

1,052,894.             Specification of Letters Patent.      Patented Feb. 11, 1913.

Application filed October 21, 1911. Serial No. 656,006.

*To all whom it may concern:*

Be it known that I, ARCHIBALD S. CUBITT, a subject of the King of Great Britain, residing at Rugby, England, have invented certain new and useful Improvements in Electrically-Heated Stoves, of which the following is a specification.

This invention relates to electric heaters and has for its object the provision of a device of this character in which auxiliary heating means are arranged so as to be active under certain conditions and inactive under certain other conditions.

My invention relates more specifically to electrically heated stoves or ovens in which the interior of the oven is raised to the desired temperature by suitably arranged heating units. In some devices of this character the walls of the oven are heat insulated so as to conserve the heat until the oven is to be brought to the desired temperature with a relatively small expenditure of energy. In ovens of this character it has been found desirable to provide an additional heater which will be a source of radiant heat for the purpose of performing broiling operations or for quickly browning or searing the outer surface of the material to be baked. By the use of a radiant broiler unit, for this purpose, this may be done without bringing the oven up to the baking temperature. I have found, however, that it is important that the oven door should not be closed when the broiler is in use, as the broiler unit is operated at a high temperature and the oven would then be overheated.

In carrying out my invention I provide, in connection with an oven having the two types of heating units, means whereby the high temperature unit is cut out of circuit when the oven door is closed. The broiling operation is performed with the oven door open, or at least with the door not entirely closed, and the arrangement is such that it is impossible to close the door with the broiler unit in circuit.

Figure 1:
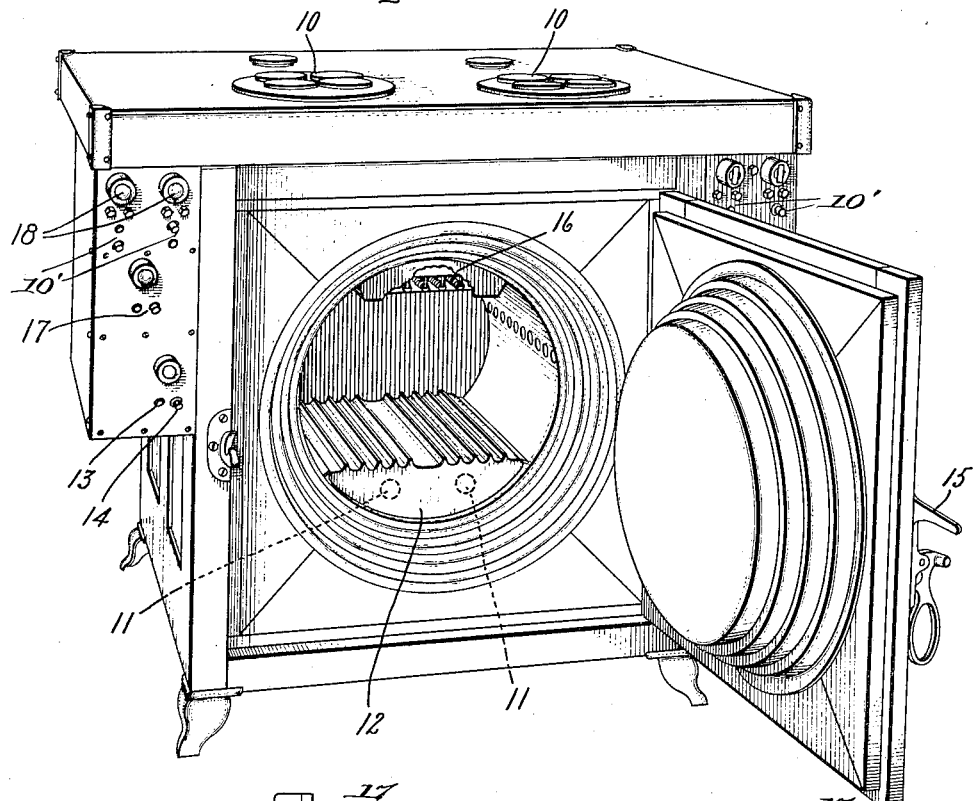
Figure 2:
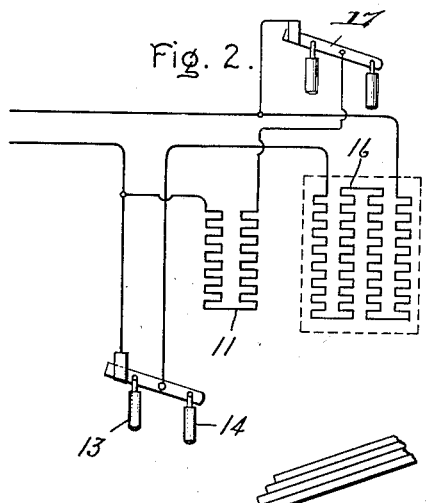
Figure 3:
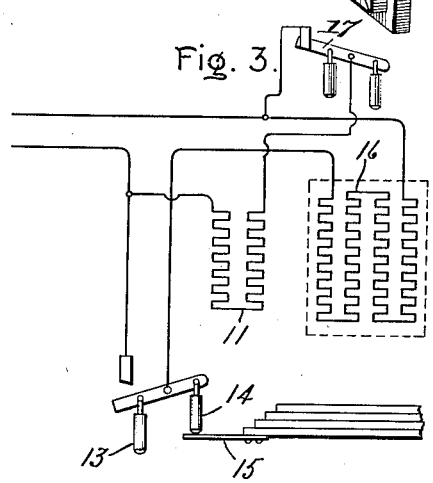

In the accompanying drawing illustrating one embodiment of my invention, Figure 1 is a perspective view of a complete stove equipped with my invention; and Figs. 2 and 3 are diagrammatic views showing the circuit connections.

Referring to the drawings, it will be seen that I have illustrated a complete cook stove. This stove is so constructed as to be what is commonly known as a fireless cooker, since the heat within the oven is conserved in such a way that the heat energy for performing the cooking is reduced to a minimum. The top part of this stove is provided with heating plates 10 which correspond with the usual stove plates. These plates are connected to the supply circuit independently of the other heating units. A number of switches operated by push buttons 10' control the connections to the said plates. The portion corresponding with the usual oven consists of a circular opening made of sheet metal separated from the outer surface of the stove by heat insulation. The particular arrangement of the oven and the means for heat insulating the same form no part of my invention. It is sufficient to say, therefore, that the oven proper is surrounded by suitable heat insulating material so as to retain the heat in the oven. Any suitable arrangement for furnishing heat to this oven may be provided, but, for purposes of illustration, I have shown it as consisting of one or more heating units 11 inserted in the mass of iron 12 in the bottom of the oven. These units may be of small wattage and are intended to be operated continuously so that the heat will be stored up in the mass of iron, and the oven, being heat insulated, will be brought up to a suitable temperature with the low wattage furnished by these units. In ovens of this character it is often desirable to provide means whereby the broiling operation may be performed in the oven. This may be for the purpose of broiling only or for the purpose of browning the outer surface of bread or searing the outer surface of meat, such as roast beef. This broiler is arranged to be operated at a radiant heat so that the broiling operation may be performed without bringing the entire oven up to the broiling temperature. I have found, however, that if the broiler unit is left connected in circuit with the door closed, the oven would soon rise to a dangerous temperature. The capacity of the units 11 is such that there will be sufficient radiation to prevent any over heating, but, as the broiler unit must necessarily be operated at a high temperature, it will be unsafe to leave the broiler unit in circuit with the door closed. In order, therefore, to prevent the door from being closed when the broiler is in circuit, I have provided means in connection with the door of the oven for cutting the broiler out of circuit. Various means may be employed for accomplishing this result, but, for purposes of illustration, I have shown a push-button switch comprising two push-buttons 13 and 14 mounted upon the stove casing. The button 14 which opens the switch is arranged so as to be engaged by a finger 15 on the door so as to open the circuit of the broiler 16. As shown in Fig. 3, the door is closed. In this case the heating units 11 are connected in circuit but may be cut off by the switch 17. The broiling unit may also be cut off by the push-button 14 so that when the door of the oven is open the broiler may be cut off. With the switch connected with the door, however, it is absolutely impossible for the broiler ever to be in circuit when the door is closed. Indicating lamps 18 are provided as shown to show whether the circuits of the various heating units in the cook stove are open or closed. In the diagram constituting Figs. 2 and 3 I have omitted the lamps, since they are not of the essence of my invention, and may be connected in the respective circuits in any well known manner. If it is desired that bread be browned or the meat seared, it is necessary that the door be opened, or at least not entirely closed.

While I have shown my invention in connection with a specific type of heating device and as operating in a specific manner in accordance with the provisions of the patent statutes, it should be understood that I do not limit my invention thereto since various modifications thereof can be made.

What I claim as new, and desire to secure by Letters Patent of the United States, is:—

1. The combination with an electrically heated oven having heat insulated walls, of an electric heater therein, a switch in said heater circuit, and means whereby the closing of the door of the oven automatically opens the said switch.

2. The combination with an electrically heated oven having heat insulated walls, of heating means for bringing the interior thereof to a suitable temperature, an auxiliary heater within said oven, and means whereby the closing of the door automatically cuts the auxiliary heater out of circuit.

3. The combination with an electrically heated oven having heat insulated walls, of heating means for bringing the interior thereof to a suitable temperature, an auxiliary heater within said oven, a switch outside of said oven for controlling said auxiliary heater, and means for automatically opening said switch upon the closing of the door.

4. The combination with an electrically heated oven having heat insulated walls, of heating means for bringing the interior thereof to a suitable temperature, an auxiliary heater adapted to be operated at a higher temperature than said heating means, a switch outside of said oven for opening and closing the circuit of said auxiliary heater, and means associated with said door for engaging the switch when the latter is closed to open the same upon the closing of the door.

5. The combination with an electrically heated oven having heat insulated walls, of heating means for bringing the interior thereof to a suitable temperature, an auxiliary heater adapted to be operated at a higher temperature than said heating means, a two button switch for opening and closing the circuit of said auxiliary heater, and a member movable with said door for actuating the opening button of said switch upon the closing of the door.

In witness whereof, I have hereunto set my hand this 10th day of October, 1911.

ARCHIBALD S. CUBITT.

Witnesses:
FREDERICK J. SKOYLE,
O. J. WORTH.